United States Patent [19]

Hoehn

[11] 4,081,615
[45] Mar. 28, 1978

[54] SUBSET SWITCHING MEANS IN APPARATUS FOR A KEY TELEPHONE SYSTEM FOR ENABLING INTERCOM SUBSTATIONS TO ACCESS TRUNK LINES

[75] Inventor: Steven Jon Hoehn, Redwood City, Calif.

[73] Assignee: Litton Business Telephone Systems, Inc., Sunnyvale, Calif.

[21] Appl. No.: 745,543

[22] Filed: Nov. 29, 1976

Related U.S. Application Data

[62] Division of Ser. No. 587,361, Jun. 16, 1975, Pat. No. 4,016,372.

[51] Int. Cl.² .............................................. H04Q 3/00
[52] U.S. Cl. ................................................. 179/18 FA
[58] Field of Search ...................... 179/18 FA, 18 FG

[56] References Cited

U.S. PATENT DOCUMENTS

| 3,254,158 | 5/1966 | Mallery et al. | 179/18 FA |
| 3,892,929 | 7/1975 | Shylo | 179/18 FA X |

*Primary Examiner*—William C. Cooper
*Attorney, Agent, or Firm*—Ronald M. Goldman

[57] ABSTRACT

In an attachment apparatus for a key telephone system of the type which permits a plurality of intercom substations to access a trunk telephone line via a common communication circuit, a novel subset operable switching circuit is disclosed that permits each subset access to said common communication circuit only on an individual one-at-a-time basis. Transistor circuitry is provided to lock out other stations when more than one subset tries to gain access at the same time.

4 Claims, 3 Drawing Figures

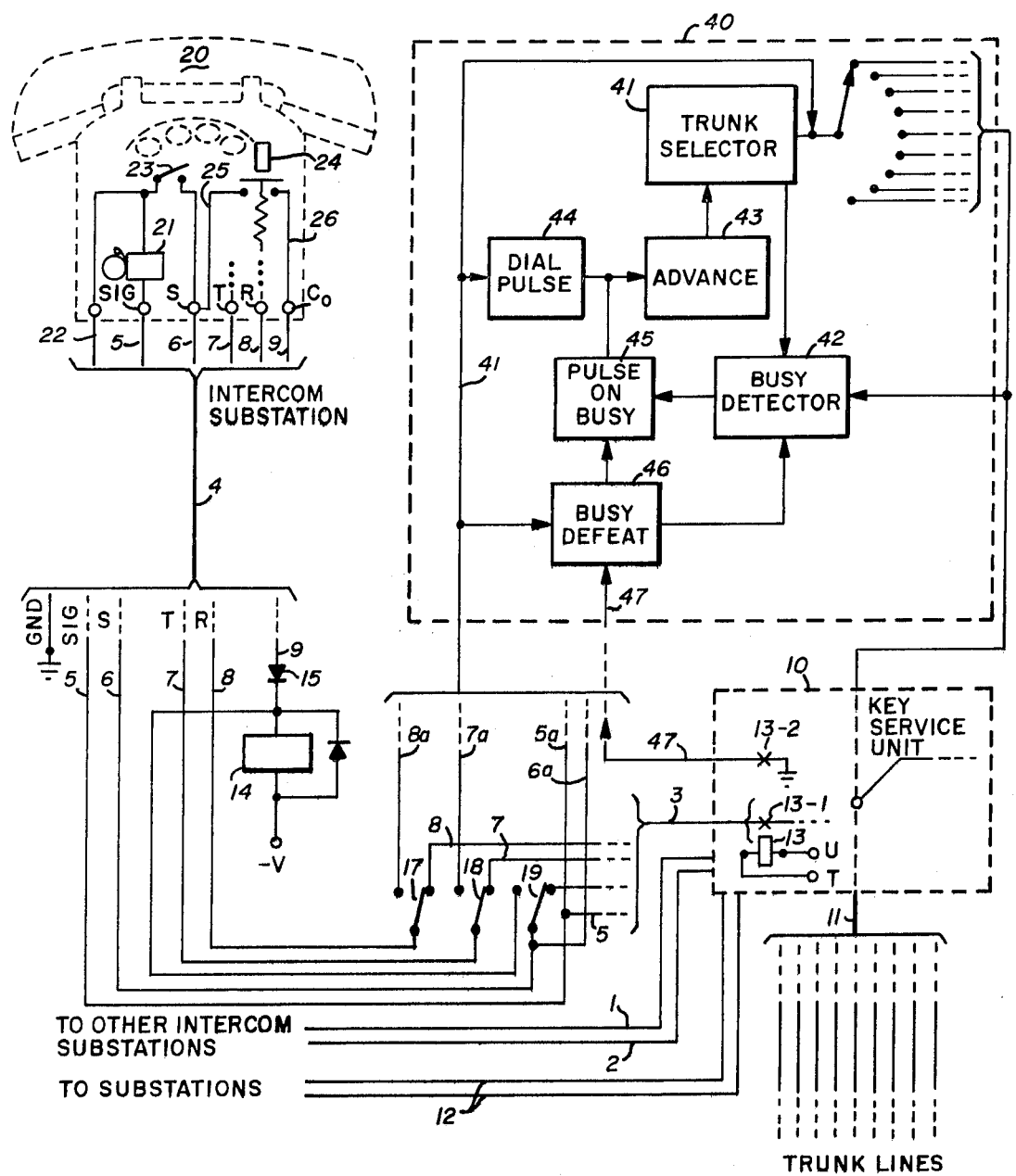
Fig_1

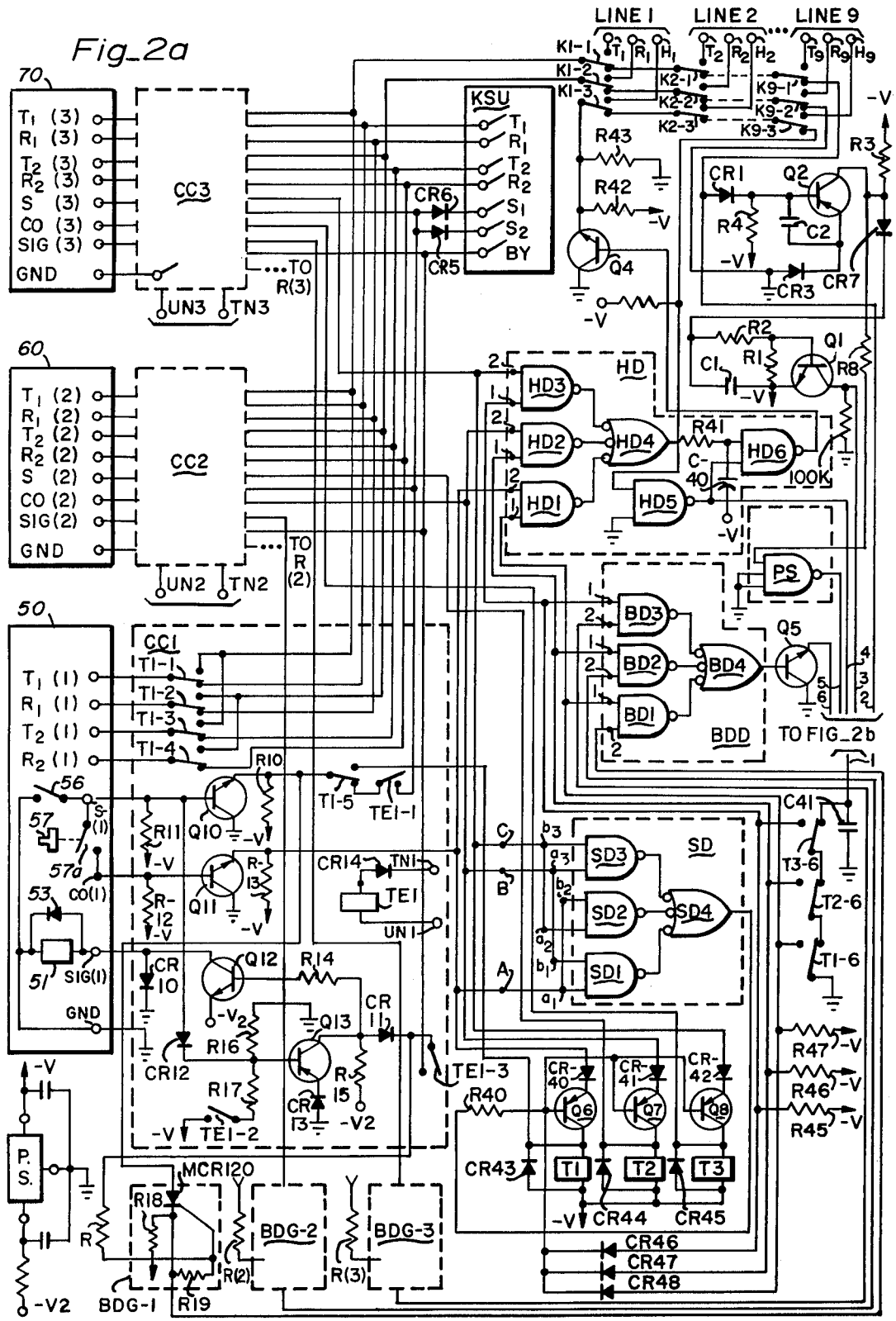
Fig_2a

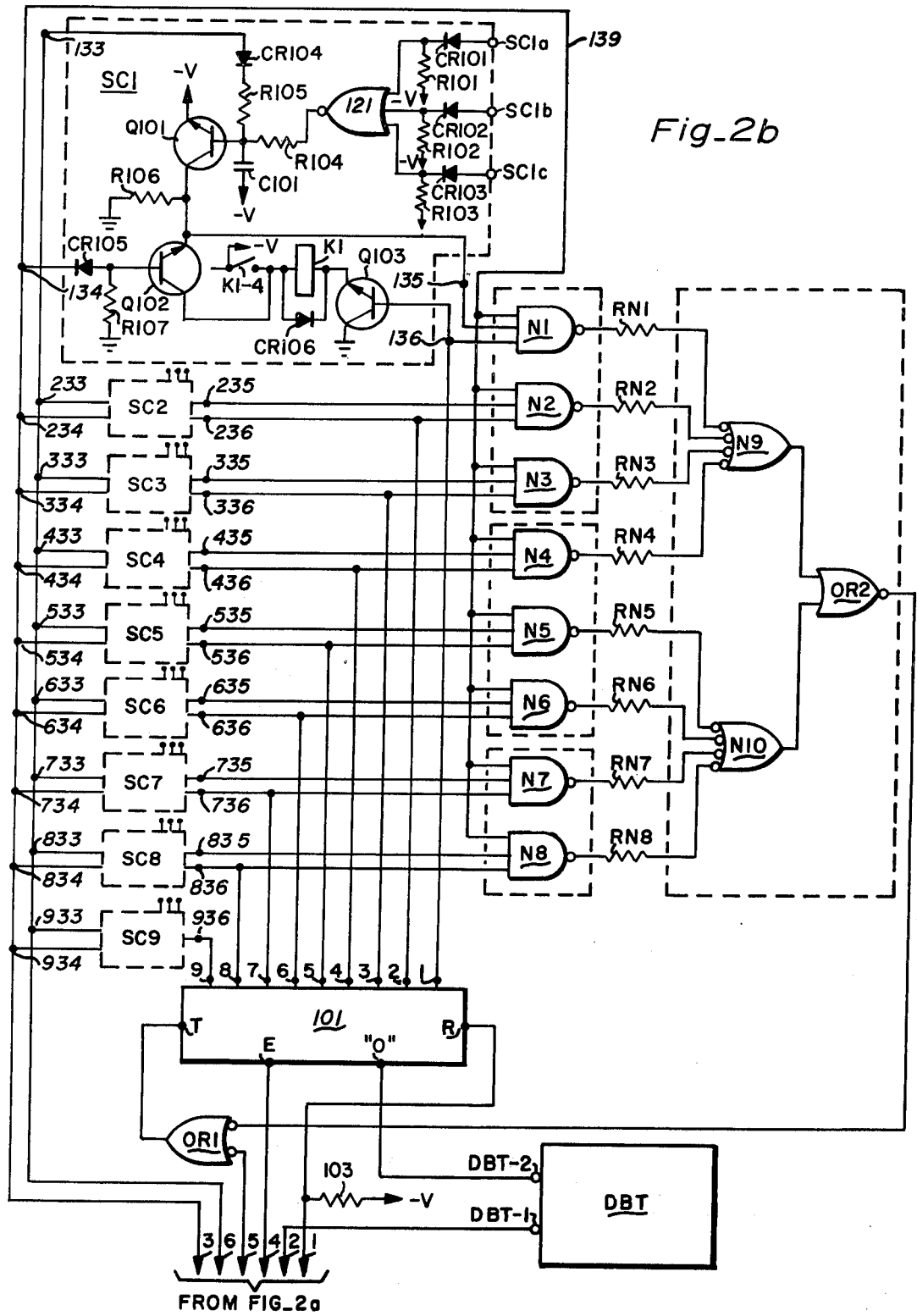
Fig_2b

SUBSET SWITCHING MEANS IN APPARATUS FOR A KEY TELEPHONE SYSTEM FOR ENABLING INTERCOM SUBSTATIONS TO ACCESS TRUNK LINES

Reference is made to my prior filed application for patent Ser. No. 587,361, filed June 16, 1975, and now U.S. Pat. No. 4,016,372, granted Apr. 5, 1977, of which this application is a division.

BACKGROUND OF THE INVENTION

This invention relates to a key telephone apparatus and, more particularly, to an attachment for allowing an intercom station in a key telephone system to obtain access to a trunk telephone line.

Key telephone systems serve to interconnect telephone substations located on a private premises with the telephone lines or trunk lines, as variously termed, supplied to the premises by the local telephone company, as well as to provide an "on-premises" communication system. Typically the key telephone system includes some substations that may access the trunk lines directly and also includes a plurality of substations, which are denoted "intercom substations", for providing communications between locations on the premises. In common key telephone systems, one or more telephone intercom substations are connected via two intercom lines to two common intercom circuits in the key service unit so that any party desiring may pick up the handset at an intercom telephone substation, thereby going "off-hook" and place the substation on the intercom line circuit. In the event that the one intercom circuit is in use, the party would intercept any conversation currently in progress and cannot use that intercom line. The party can then position a selector "push key" provided on the telephone instrument to the position of the second intercom line circuit and access the second intercom line. The user can then use the intercom line to reach another intercom substation. Each intercom substation includes a sounder which may be selectively actuated over a control line either by the operator controlling the key service unit, or by another intercom substation if the party at such substation dials the digits of the intercom substation wherein the key service unit decodes the dialed digit and applies the control signal to the sounder of the called substation.

Customarily the intercom stations do not have access to the trunk telephone lines. Hence while persons having access to the intercom substation are permitted to place a call from one intercom station to another to carry on an on-premises conversation, such persons cannot use the intercom substations for placing calls off the premises. Likewise calls coming in over the trunk lines cannot be connected to the intercom substation. Thus when an incoming outside call is received over an incoming trunk line at the operator's key service unit, the operator ascertains the identity of the person whom the calling party desires to reach. If that person is located at an intercom substation, the operator dials the extension number of that intercom substation, and the key service unit of the system operates its switching devices to select a line relay associated with the units and 10 digits of the called intercom substation. When the line relay is actuated an electrical circuit is closed over the control line to the sounder contained in the called intercom substation. The called party in answer picks up the handset and receive the information from the operator and if the called party desires to speak directly to the calling party, the called party must call back over a regular substation. The called party cannot reach the calling party over the intercom line. These key telephone systems are of a conventional and well known structure. Typical of key telephone systems in commercial use are the 1A22model manufactured by ITT Company, and the Litkey key telephone system distributed by Litton BTS, and the T.I.E. Company key telephone system. Conceivably there are circumstances where it is desirable to allow a telephone intercom substation to directly access a trunk line in order to avoid the aforedescribed inconvenience and to obtain a greater flexibility for an existing key telephone system.

In my prior application for patent, Ser. No. 787,361, filed June 16, 1975, of which this application is a division, a unique apparatus for a key telephone system for enabling intercom stations to access trunk lines is described.

Briefly the intercom to trunk access unit of that invention includes a trunk selector which may selectively connect to a plurality of trunk telephone lines entering the key telephone system, a selector advance unit connected to the trunk selector for advancing the selector in response to input pulses, such as dial pulses. A busy detector is included in the trunk selector and an advance-on-busy unit, which has an input connected to the busy detector and has an output connected to the selector advance unit, to supply a pulse to the selector advance unit in response to an output from the busy detector whereby the trunk selector is automatically advanced to the next trunk line. As a further aspect a busy-defeat unit for preventing selector advance-on-busy is connected to and controlled jointly by the key service unit and by the intercom substation to couple an output to the advance-on-busy unit. Relay means, located at the key service unit remote from the telephone substation, is coupled to the intercom substation for coupling the intercom station to the trunk access unit. And push button switch means are located at the intercom substation for actuating the relay means.

In the operation of that unit, the removal of the substation handset places the intercom substation in the "off-hook" condition. Operation of the push button switch at the intercom station actuates the relay means to couple the intercom station through the the trunk access unit. The trunk access unit awaits and responds to a dialed digit, such as "1", which actuates the selector advance and that in turn steps the trunk selector to the corresponding first trunk position. If the trunk is not in a busy condition the selector connects the intercom communication line through to the first trunk line. However if the first selected line is in a busy condition, the busy detector signals the advance-on-busy circuit which in turn supplies a control signal or pulse to the selector advance unit and in response the advance steps the trunk selector to the next trunk and the next trunk is in turn tested for "busy". This process of "trunk hunting" continues until the first available non-busy trunk line is reached, whereupon the intercom line is connected through to that trunk line.

Further in accordance with that invention, if the intercom station is placed in an off-hook condition in response to a signal from the operator, the busy-defeat unit receives one input, such as from the line relay associated with the called substation. By remaining off-hook, the party simply operates the push button switch at the intercom station and accesses the intercom-to-trunk access unit. In so doing, the push button switch further supplies the second input to the busy-defeat circuit, which thereupon disables the busy-advance unit. The party at the substation dials the digit of the selected trunk. The digit pulses are received by the selector advance unit which steps the trunk selector from the initial position over to the position of the selected trunk line and the selector switches through the intercom station to the trunk line. Inasmuch as the party is responding to a call on the selected trunk line, the trunk line would otherwise show busy and prevent the selector from stopping at that trunk hence the busy-defeat circuit disables the advance-on-busy unit.

It is recognized that the aforedescribed apparatus permits use of a single communications circuit by each of the individual telephone subsets. To ensure privacy of any call established between an intercom substation and an outside trunk line over that communications circuit and to ensure proper operation of the circuits limiting the access to the aforedescribed line to only one intercom subset at any time is desired.

SUMMARY OF THE INVENTION

A principal object of the present invention therefore is to provide in the aforedescribed apparatus a novel circuit for allowing line access or seizure of the intercom to trunk line access unit as well as to prevent misoperation thereof. A second object of this invention is to ensure privacy of communications carried over the communications channel thereby established.

Briefly, in accordance with this invention, in an apparatus for enabling a plurality of telephone subsets having access to a common communications circuit, each of which subsets contains a hookswitch and a momentarily operable pushbutton switch means and at least two subset circuits, a first one of said subset circuits is completed through the hookswitch and the second one of such subset circuits is completed through the hookswitch and the pushbutton switch means in series. A plurality of relays and associated relay driving transistor means corresponding to said plurality of pushbutton switch means is provided; each of said relay means includes a contact means for coupling said first subset circuit in circuit with said common line responsive to said associated relay means being placed in the operated condition, said driving transistor means being coupled to an associated one of said second subset circuits responsive to operation of the associated pushbutton switch means during the presence of an enabling bias at the base of such transistor means for providing operating current to said associated relay means; gating means associated with each pushbutton switch means in said second subset circuits and said relay driver transistor means normally providing an enabling bias to the base of all said driving transistor means and responsive to concurrent operation of more than one of said pushbutton switch means for biasing all of said driving transistor means into the noncurrent conducting condition during such concurrent operation to prevent operation of more than one of said plurality of relay means simultaneously; a plurality of holding circuit means, each including said first subset circuits and a contact means of an associated relay means for holding the associated relay means in the operated condition responsive to operation of said relay means and irrespective of the current conducting condition of the associated driving transistor means but only so long as said subset is in the off-hook condition; and an inhibit circuit means including a contact on each of said relay means coupled to all of said driving transistor means and responsive to operation of any one of said relay means for biasing all said driving transistor means in the noncurrent conducting condition to prevent operation of any other relay means during continued operation of any one of said relay means; and each of said relay means including make contact means for connecting said first subset circuit to said common communications circuit.

The foregoing objects and advantages of the invention together with the structure characteristic of the invention hereinbefore briefly summarized are better understood by considering the detailed description of the preferred embodiments of the invention which follow, considered together with the figures of the drawings.

BRIEF DESCRIPTION OF THE DRAWINGS

In the drawings:

FIG. 1 symbolically illustrates a preferred embodiment of a system containing my invention; and FIGS. 2a and 2b illustrate schematically a specific preferred embodiment of the invention.

DESCRIPTION OF THE PREFERRED EMBODIMENTS

An embodiment of the invention is illustrated in FIG. 1, partially schematically and partially symbolically, so as to bring out clearly and concisely the novel relationships between apparatus characteristic of the invention, unencumbered with details of known apparatus not necessary to an understanding of the invention. A key service unit of the conventional key telephone system is indicated symbolically by the dash lines 10. A remote intercom substation associated with the key service unit is indicated generally by the dash lines 20, which outline a familiary telephone set, and an "intercom-to-trunk" access unit is indicated generally by dash lines 40. As is conventional, the key service unit is connected to the outside trunk telephone lines, illustrated symbolically by the nine trunk lines 11, entering the key service unit. As is conventional each trunk line includes three separate electrical leads, designated ring, tip, and sleeve, and the trunk lines provides the communications channels through the utility or "outside" telephone system to the key telephone system.

As is conventional in the key telephone systems, a plurality of telephone lines extend from the key service unit to remote telephone substations, which are not illustrated, which lines are represented generally by the two lines, 12. And in addition a plurality of "intercom" substation telephone lines extend from the key service unit to a plurality of remotely located intercom substations. These intercom lines are represented in the figure by the three intercom lines 1, 2 and 3. Only one intercom line per station is illustrated in this embodiment. In present key systems, the telephone substations connected to the key service unit over lines 12 through conventional circuits in the key service unit have and obtain direct access to the trunk lines 11. However the intercom lines, such as 1, 2 and 3, cannot access those trunk lines in a conventional key telephone system.

Cable 4 couples the insulated electric wires or lines of the intercom communication line, as hereinafter explained in greater detail, between intercom telephone substation 20, selected by the user to have access to trunk lines 11, and key service unit 10. Cable 4 includes a signal line 5, the S or sleeve line 6, the T or tip line 7, and the R or ring line 8, which are conventional. Cable 4 also includes a control line 9, which is added in accordance with the invention.

Substation 20 includes an electrical sounder 21, a ground connection 22 to electrical ground or common, a hookswitch, not illustrated, which includes a plurality of contacts, one of which is illustrated as hookswitch contact 23, shown in its normal position. Other structural aspects of telephone substation 20, including the rotary type dial pulsing mechanism, the receiver and transmitter circuits, which elements are connected through leads 7 and 8, are not illustrated inasmuch as they are of conventional design and do not contribute to an understanding of the invention.

One terminal of sounder 21 is connected to electrical ground potential via line 22. Ground potential is connected also to the transfer contact of the normally open hookswitch contacts 23.

A spring return push button switch 24 is installed in substation 20. The push button switch includes a set of normally open contacts 24a. One of the switch contacts 24a is connected via electrical lead 25 to S line 6 and the other one of switch contacts 24a is connected via electrical lead 26 to control line 9.

If the telephone employed is an ITT Type 510, the telephone contains a "push-key" which includes both a push button switch and an intercom line selector switch (or key) in one integral unit. In such telephone the equivalent push button section is used and a separate push button switch need not be installed.

As is conventional, the key telephone system contains an intercom station selecting apparatus for activating the signal buzzer, such as sounder 21, of a selected station. This is accomplished with conventional apparatus, not illustrated, that selects the T and U leads, representative of the tens and units digits of the station selection relay corresponding to the tens and units digit of the selected intercom station. One such selection relay is partially illustrated as relay 13 and this relay is associated with intercom station 20. The relay includes a set of make contacts 13-1 for completing a circuit to sounder 21. An additional set of make contacts, 13-2, is included on the selection relay. One of the contacts is connected to ground potential and the other is connected in circuit by lead 47 to an access unit 40.

An electromagnetic type relay 14, a conventional switching device of known structure, is provided at the location of the key service unit. The relay includes a winding 14, a first transfer contact set 17, a second transfer contact set 18, and a third transfer contact set 19. As represented in the figure, each transfer contact set includes a make contact, a break contact, and a transfer contact which pivots from mechanical and electrical contact with the "break" contact to such contact with the "make" contact when the relay is energized. One end of relay winding 14 is connected in series with a diode 15 to control line 9 and the other end of winding is connected to the negative polarity terminal of a DC voltage source —V. Diode 9 is poled so as to permit current flow in a direction from "ground" to the source —V. Suitably another diode 16 is connected across the relay coil and poled opposite to diode 15.

Signal lead 5 extends through to cable 3 into the key service unit, where it is connected generally to the contacts of a station selection relay, symbolically illustrated as 13, associated with intercom station 20. The signal lead 5 is also connected via line 5a through a cable, symbolically represented as 41, to the intercom-to-trunk access unit 40.

The make contacts of each of transfer contacts 17 and 18 are connected via lines 8a and 7a of cable 41 into the trunk access unit. The make contact of contact set 19 is connected by a lead to the ground side of relay winding 14 to establish a holding circuit. Lead 6 is also connected via lead 6a to trunk access unit 40. The break contact of transfer contact sets 17, 18 and 19, are connected to lines 8, 7 and 6, respectively, which extend into the key service unit. It is seen that the relay switching device in accordance with the teachings of this invention permits breaking the electrical circuit established over the R, T, S and SIG leads between the key service unit and the remote intercom substation.

The intercom-to-trunk access unit 40, as is symbolically illustrated in the figure, is a separate attachment that is coupled in circuit between the trunk lines 11, the relay 11, the relay switch means 14, and calbe 4 to remote intercom telephone substation 20. The functional purpose of the access unit as becomes apparent is to connect the intercom substation to an available (non-busy) trunk line or, alternatively, to a selected trunk line. Various types of known electromchanical or electronic equipment and devices are available for together performing the function of intercom-to-trunk access unit 40 in the manner described, including one novel circuit means illustrated in FIG. 2 and hereinafter to be described is preferred.

Those skilled in the art are familiar with the conventional step-by-step or Strowger type trunk-hunting selector switch which when actuated sequentially moves a set of contacts from trunk telephone line to trunk line stopping to test for a busy line condition until the first available non-busy trunk line is located and a through connection for telephone communication is thereupon made. Likewise incorporated in such types of devices are means for defeating an advance-on-busy so that in response to signals from the telephone substation, such as dial impulses, the selector switch can step its contacts to the selected trunk line, even though such trunk line is "busy", and establish a connection therewith. These apparatus are illustrated in figure symbolically by function within the dash lines 40.

Thus a trunk selector 41 is provided which is shown to have a connection movable to any one of the nine positions associated with the nine trunk lines from cable 11 for connecting the telephone lines from cable 41 thereto. A busy detector 42 is provided as an element to test the trunk lines for a busy conditon. The busy detector has an input to the trunk selector and an output connected to a "pulse on busy" unit 45. An advance means 43 is provided for providing a signal to advance the trunk selector from one position to the next. The advance means has an input connected to the outputs of each of a "dial pulse" unit 44 and the "pulse on busy" unit 45. The dial pulse unit receives dial signal information, such as dial pulses, over the lines in cable 41 and signals advance unit 43 with the appropriate information. The pulse-on-busy unit 45 is structured to supply a signal to activate the advance means when the busy detector detects a busy condition.

A busy-defeat unit 46 has an output connected to the busy detector 42 or, as by choice, to the pulse-on-busy circuit. There are two inputs to the busy-defeat circuit 46; one of the inputs is supplied from intercom substation lines via cable 41 and the other input is supplied by the key service units via an electrical lead 47. Both inputs must be energized to activate busy-defeat unit 45.

Conventional power supplies necessary to operate the equipment are included but are not illustrated. Typically the positive terminal of the source is connected to ground and the negative terminal forms the active lead, −V, as symbolically illustrated.

Considering a first mode of operation of the invention in which the party at the intercom substation desires to access one of the trunk lines 11, the procedure proceeds as follows: By lifting the substation handset, station 20 goes off-hook and hookswitch contacts 23 close. Electrical ground potential via lead 22 and closed contacts 23 is placed on line 6 and applied over cable 4 into the key service unit to represent the substation as "busy". The calling party then depresses momentarily pushbutton switch or "access" switch 24. Switch 24 applies a path from electrical ground from line 6, lead 25, switch contacts 24a, lead 26, line 9 of cable 4, diode 15, relay coil 14 to the negative voltage source −V. Current flows in that circuit and energizes relay 14.

Relay 14 energizes and operates its transfer contacts 17, 18 and 19 from the break to the make position. This opens the line 6 into the key service unit and closes a circuit to hold relay 14 energized, via ground over line 6 at contact set 19; and transfer contacts of 17 and 18 transfers leads 7 and 8, respectively, from an electrical connection with the corresponding lines of key service unit 10 to an electrical connection with the corresponding leads 7a and 8a of cable 41 to access unit 40. The party then may operate his dial mechanism, not illustrated, by dialing the number 1 for example. The dial mechanism sends a single signal voltage or pulse over lines 7 and 8, and leads 7a and 8a to the dial pulse detector. The dial pulse detector 44 signals advance unit 43 which in turn provides an output to the trunk selector 41 causing the selector to move from the normal "off trunk" position illustrated to a connection with the first trunk line and the first trunk line is thereupon tested for a busy condition by busy detector 42. If the first trunk line tests busy, busy-detector 42 provides a signal to the "pulse-on-busy" unit 45 which in turn supplies another pulse to the advance unit and the latter in turn causes the selector to move sequentially to the next trunk line. If the next trunk line also tests busy, the foregoing operation on detection of a busy condition is repeated. When the selector finally reaches a non-busy trunk, the communication line from the intercom substation from the input of access unit 40 are coupled through to the selected trunk line at the output.

Once the trunk line is obtained the calling party receives dial tone and may place an off-premises call via the trunk line, in a conventional manner. Upon completion of the call the party at the intercom substation replaces the handset in its cradle which opens hookswitch contact 23, which in turn opens the holding circuit to relay 14, which restores, and all the circuits are restored to normal.

Considering now a second mode of operation: When a call is received over a trunk line at key service unit 10 and the calling party relates to the operator a desire to reach a party who is located at remote intercom substation 20. The operator places the calling party on "hold" and dials the number of the intercom station. Switching circuitry in the key service unit selects the station relay, here relay 13, and applies a voltage across its T and U terminals. Relay 13 operates and applies a ground over contact 13-2 to lead 47 and applies a potential via contact 13-1 to signal line 5 to complete a path for current over line 5, sounder 21, lead 22 to ground. The sounder operates and signals the party at the intercom station.

When the called party answers by lifting the handset at substation 20 from its cradle, hookswitch contact 23 operates and places a ground on line 6. By conventional circuits, not illustrated, this causes the key service unit to remove the voltage from line 5 to terminate operation of sounder 21. The operator advises the called party of the incoming call on one of the trunk lines, for example, trunk line "5", and the called party while retaining his telephone off-hook, simply depresses momentarily push button 24. Thereupon as in the aforedescribed operation, ground potential over line 6 is placed onto control line 9 resulting in the operation of relay 14 in the same manner as hereinbefore described. The second pair of contacts on relay 13, 13-2, applies a signal, such as ground potential, over line 47 to one input of the busy-defeat circuit 46. Likewise a signal is supplied over line 41 to the second input of the busy-defeat circuit, and the busy-defeat circuit is actuated. This is necessary since incoming trunk line 5 which is on "hold" will test busy.

The called party then dials the digit 5. This produces a serial group of five pulses which pass over lines 7 and 8 and 7a and 8a to access unit 40. In the access unit the dial pulse unit 44 relays these pulses to the advance unit 43 which causes the selector unit to advance to the trunk line 5. Thereupon selector 41 completes the communication circuit between the intercom station and trunk line 5. Upon completion of the call the called party restores the handset to its cradle in the substation 20, the hookswitch contact 23 opens, relay 14 restores to normal, and the circuits are restored to their normal position.

As is also apparent, intercom station 20 operates in the system in a conventional manner as long as switch 24 is not operated. Thus telephone calls to and from substation 20 and other intercom stations within the key telephone system are established and proceed in a conventional manner.

As is apparent from the foregoing description, modifications to the key telephone system required to incorporate the added functions of the invention includes the incorporation of a signaling circuit at the selected intercom station, such as the switch 24; the addition of a new cable 4 between the intercom substation and the location of the access unit; a cable from the key service unit to the access unit; the addition of a relay 14 and switching contacts, which is simply installed by breaking the direct connection at the key service unit and wiring the leads to the relay contacts, as well as adding a make contact to the selection relay at the key service unit and extending an electrical connection therefrom to the trunk access unit; and extending the connection to the trunk lines to the trunk access unit.

Thus the invention allows expansion of an ordinary key telephone system in a simple and uncomplicated manner.

A preferred embodiment of the aforedescribed invention is presented schematically in FIGS. 2a and 2b. This embodiment is of greater complexity inasmuch as it includes additional features such as the capability of handling three telephone intercom substations and employing two intercom telephone lines as well as various additional features which hereinafter becomes more apparent to the reader. The embodiment is illustrated using various known symbols to represent the conventional elements from which the invention is formed.

A remote intercom telephone substation 50 is symbolically represented by a rectangle. The components thereof, relevant to an understanding of the instant invention, include a sounder 51, shunted by a protective diode 53, ground connection GND, hookswitch contacts 56, push button 57 and its normally open switch contacts 57a. One of the contacts of hookswitch 56 and one terminal of an electronic sounder 51 are connected in common to the ground terminal GND. The other contact of the hookswitch is connected to terminal S(1) in common with one of the push button contacts 57a. The other contact of switch 57a is connected to terminal CO(1). The remaining terminal of sounder 51 is connected to terminal SIG(1). Terminals $T_1(1)$ and $R_1(1)$ are connected to the first intercom line similarly designated and $T_2(1)$ and $R_2(1)$ are the lines of the second intercom line as connected to the first remote substation. The designations of T and R used herein in connection with leads and terminals refers to the tip and ring leads familiar to those skilled in telephone circuits.

The substation includes a conventional dial mechanism and transmitter and receiver apparatus, not illustrated, a selector switch to place that apparatus in circuit with the T and R leads of either the first or second intercom line, as well as other conventional components that are not here illustrated. Some telephone sets have a "push-key" switch that contains a selector switch for selecting one of two intercom lines and a push button switch. In those telephones the push button switch is used as switch 57.

The terminals of telephone 50 are connected by the various illustrated electrical leads, suitably formed into a cable, to the control circuit CC1 indicated in dash lines. For convenience, the leads may be referred to hereinafter by the designation of the associated terminal. The elements of CC1 are described hereinafter in greater detail.

Similarly the conventional system key service unit is represented in dash lines labeled KSU and includes extending therefrom corresponding terminals and leads $T_1$, $R_1$, $T_2$, $R_2$, $S_1$, $S_2$ and BY.

A second telephone intercom substation is represented by the rectangle 60 and a third telephone intercom substation by the rectangle 70. Each of the stations 60 and 70 are of the same structure as that of the aforedescribed station 50. Thus station 60 includes terminals GND, SIG(2), CO(2), S(2), $T_1(2)$, $R_1(2)$, $T_2(2)$, and $R_2(2)$, and corresponding electrical leads extending therefrom to the control circuit CC2 associated therewith in the vicinity of the key service unit. And station 70 includes corresponding terminals GND, SIG(3), CO(3), S(3), $T_1(3)$, $T_2(3)$ with leads extending to the associated control circuit CC3 in the vicinity of the key service unit.

Briefly, the elements found within control circuit CC1 have corresponding elements connected together in the same manner for performing the same functions in each of the other control circuits CC2 and CC3. Accordingly only the elements of CC1 need be described in any detail.

Control circuit CC1 contains transistors Q10, Q11 and Q12, suitably of an NPN type, and transistor Q13, suitably a PNP type. The base of the Q10 is connected to S(1) and a bias resistor R11 is connected between the Q10 base and source −V. The collector of Q10 is grounded. A resistor R10 is connected between Q10 emitter and source −V. Emitter of Q10 is also connected to transfer contact of a relay contact set $T_1$-5 and to the anode of a silicon controlled rectifier MCR 120 of the busy defeat gate circuit BDG1, later described. The transistor Q10 forms an electronic switch that is biased to the "off" condition.

Transistor Q11 base is connected to terminal CO(1) and in series with a bias resistor R12 to source −V. Transistor Q11 collector is connected to ground. The emitter of Q11 is connected in series with a bias resistor R13 to source −V and is also connectd in circuit with input A of the sieze detector and the anode of a diode CR40, later described in greater detail. Transistor Q11 is an electronic switch which is biased to the "off" condition.

The corresponding transistors in control circuits CC2 and CC3 have their emitters connected to input B and anode of diode CR41 and to input C and anode of diode CR42, respectively.

Transistor Q12 collector is connected to terminal SIG(1). A diode CR10 has its anode connected to the Q12 collector and its cathode to ground. Transistor Q12 emitter is connected to source $-V_2$. The base of Q12 is connected in series with resistor R14 to the collector of transistor Q13. Transistor Q12 forms an electronic switch that is normally biased in the "off" condition.

Transistor Q13 base is connected in series with bias resistor R16 to ground and in series with a resistor R17 to the transfer contact of contact set TE1-2 of relay TE1, described hereinafter. Additionally a dide CR12 has its anode connected to base of Q10 and its cathode to base of Q13. Another diode CR13 has its anode grounded and its cathode connected to emitter of transistor Q13. Collector of Q13 is connected in series with resistor R15 to source $-V_2$ and to anode of diode CR11. The cathode of diode CR11 is connected to the transfer contact of relay contact set TE1-3 and in series with a resistor R to the gate of a silicon controlled rectifier MCR 120.

A station selection relay TE1 is provided. The relay winding is connected in series with a diode CR14 between terminals UN1 and TN1, which although not illustrated are connected in circuit with the selection circuits of conventional structure located in the key service unit KSU. The corresponding station selection relays, not illustrated, in each of CC2 and CC3 are connected in circuit with terminals UN2 and TN2 and UN3 and TN3, respectively, and via those terminals to the key service unit.

Relay TE1 contains make contact sets TE1-1, TE1-2 and TE1-3. The fixed or make contact of TE1-2 is connected to source −V; the make contact or relay contacts TE1-3 is connected in multiple with the corresponding relay contacts in each of CC2 and CC3 to terminal BY of the key service unit KSU. Relay contact set TE1-1 has its transfer contact connected to break contact of relay contacts T1-5 and the make contact of TE1-1 is connected to KSU terminals S1 and S2 in series with diodes CR5 and CR6 via connection to the anodes thereof and in multiple with the corresponding relay contact in each of CC2 and CC3.

Control relays T1, T2 and T3 are associated with a corresponding one of control circuits CC1, CC2 and CC3. Control relay T1 has six sets of transfer contacts T1-1, T1-2, T1-3, T1-4 and T1-5, illustrated within CC1 and T1-6.

Each of relays T2 and T3 have corresponding contacts, not illustrated, in each of CC2 and CC3, and have contact sets T2-6 and T3-6, respectively.

The transfer contacts in relay contact sets T1-1, T1-2, T1-3 and T1-4 are connected to terminals $T_1(1)$, $R_1(1)$, $T_2(1)$, and $R_2(1)$ of the telephone set, respectively. The break contacts thereof are connected to terminals $T_1$, $R_1$, $T_2$ and $R_2$, respectively, of the key service unit KSU, and in multiple to the corresponding circuit locations in each of CC2 and CC3.

The first and second intercom circuits, not illustrated, in the key service unit KSU, are connected in circuit, respectively, with one pair of the $T_1$ and $R_1$ and $T_2$ and $R_2$ terminals.

The make contact of relay contact sets T1-1 and T1-3 are connected in common and to the transfer contact of line relay contact set K1-1 and in multiple to the corresponding relay contacts, not illustrated, in CC2 and CC3.

The make contact of relay contact sets T1-1 and T1-4 are connected in common and to transfer contact of line relay contact set K1-2 and in multiple to corresponding relay contacts in each of CC2 and CC3.

As becomes apparent hereinafter, an intercom line T and R lead is placed in circuit with the corresponding tip (T) and ring (R) leads to an outside trunk line by means of the relay contacts K1-1 and K1-2, as hereinafter described.

A detecting circuit SD, which I term a "seize detector", is provided to allow only one remote station to access the unit at any given period of time. Hence, if more than one remote station attempts to gain access to the unit, as described in greater detail hereinafter in connection with the description of operation, the drive transistors Q6, Q7 and Q8 are forward biased only if one unit attempts to access at one time. The seize detector consists of four conventional logic AND gates designated SD-1, SD-2, SD-3 and SD-4, symbolically illustrated. AND gates SD-1, SD-2, and SD-3 have two inputs each labeled $a_1$, $b_1$, $a_2$, $b_2$, and $a_3$ and $b_3$, respectively. One input of gate SD-1, $a_1$ to the second $b_2$ input of AND gate SD-2, the second input $b_1$ of SD-1 is connected to the second input $b_3$ of gate SD-3; the second input $b_2$ of gate SD-2 is connected to the first input $a_3$ of gate SD-3. The outputs from each of the gates are connected to a respective one of the three inputs of gate SD-4 and the output terminal of gate SD-4 provides the output of seize detector SD. For convenience, the three inputs to SD are labeled A, B an C and input A is connected to the emitter of transistor Q11 and inputs B and C are connected to the emitter of the corresponding transistor in CC2 and CC3.

Transistors Q6, Q7 and Q8, suitably of the PNP type, are provided as drivers for relays $T_1$, $T_2$ and $T_3$, respectively. The emitter of Q6 is connected to the cathode of a diode CR40; the emitter of Q7 is connected to the cathode of a diode CR41; the emitter of Q8 is connected to the cathode of a diode CR42; the collector of Q6 is connected in series circuit with the winding of relay T1 to source −V; the collector of Q7 in series with relay T2 winding to source −V; and the collector of Q8 in series with relay winding T3 to source −V. Each of the three relay windings is shunted by a diode, CR43, CR44 and CR45, poled so as not to normally conduct current, respectively, as transient voltage protection for the associated transistor.

The make contact of relay contact set T1-5 in control circuit CC1, is connected to the collector of Q5 and relay T1 winding via a lead I may term a hold output lead; a correspnding lead from CC2 is connected to collector of Q7; and a corresponding lead from CC3 is connected to collector of Q8 so as to provide a current path to the associated relay winding in a "hold" circuit.

The output of seize detector gate SD4 is connected in series with resistor R40 to the base of each of transistors Q6, Q7 and Q8.

Busy Defeat Detector

Four conventional logic AND gates, represented by schematic symbols, form what I term a busy defeat detector, represented within the dash lines formed into a rectangle labeled BDD. This includes AND gates BD1, BD2 and BD3, which are of the two input type, and gate BD4 which is of the three input type. The construction, including power source connections, of these conventional logic gate devices are well known and need not be considered in detail. The respective first and second inputs of each of gates BD1 through BD3 form the six inputs of the busy defeat detector as shown. The outputs of each gate BD1, BD2, and BD3 is connected to a corresponding input of AND gate BD4. The output of the gate BD4 is connected to the base of a transistor Q5. Transistor Q5, suitably an NPN type, additionally has its collector connected to ground and its emitter connected in multiple to each of the corresponding 133 . . . 933 inputs of the select circuits SC1 . . . SC9 illustrated in FIG. 2b, hereinafter described in greater detail, and functions as a "busy defeat driver" electronic switch.

A device I term a "busy defeat gate" is provided for each of the control circuits and is represented in dash lines as BDG-1, BDG-2 and BDG-3 with the details illustrated only for BDG-1. This novel circuit includes a silicon controlled rectifier, abbreviated SCR, MCR 120, resistor R18 and resistor R19. The anode of MCR 120 is connected to the emitter of transistor Q10 located in control CC1. The cathode end of MCR 120 is connected in series with resistor R18 to source −V and is connected to the second input of AND gate BD1 in the busy defeat detector BDD. The gate of the SCR is connected in series with resistor R to the transfer contact of relay contact set TE 1–3 located as illustrated in control circuit CC1. Resistor R19 is connected between the SCR's gate and cathode.

Similarly, the corresponding components in each of BDG-2 an BDG-3 are connected to the second inputs of AND gates BD2 and BD3 and to corresponding elements in each of control circuits CC2 and CC3.

Hold Detector

Six logic AND gates of conventional structure, represented by conventional schematic symbols, form what I term a "hold detector" outlined in dash lines HD. This includes AND gates HD1, HD2, HD3, HD5 and HD6 which are of the two-input type, and AND gate HD4 which is a three-input type. The output of each of AND gates HD1, HD2 and HD3 are connected to a corresponding one of the three inputs of AND gate HD4. The output of AND gate HD4 is connected to one input of gate HD6 in series with resistor R41. A capacitor, C40, is connected between that input of HD6 and source −V. One input of AND gate HD5 is connected to make contact of relay contact set K9-3 and in series circuit with bias resistor R5 to source −V. The second input of gate HD5 is connected to electrical ground. The output of gate HD5 is connected to the remaining one of the two inputs of AND gate HD6. That remaining input of gate HD6 is also connected in circuit with terminal E of electronic counter 101, illustrated in FIG. 2b, hereinafter later described.

The output of gate HD6 is connected to the base of a switching transistor Q4. Transistor Q4, suitably an NPN type, has its collector connected to ground and its emitter connected to the transfer contact of relay contacts K1-3. Additionally a resistor R43 is connected between the emitter and ground and a second resistor R42 is connected between the emitter and source −V for biasing the transistor.

Input 1 of gate HD1, input 1 of gate BD1, make contact or relay contacts T1-6, the anode of diode CR48, and one end of resistor R47 are connected in common by the illustrated electrical lead.

Input 1 of gate HD2, input 1 of gate BD2, make contact of relay contacts T2-6, anode of diode CR47 and one end of resistor R46 are connected in common by the illustrated electrical lead.

Input 1 of gate HD3, input 1 of gate BD2, make contact of relay contacts T3-6, anode of diode CR48 and one end of resistor R45 are connected in common by the illustrated electrical lead.

The cathode ends of diodes CR46, CR47 and CR48 are connected in common to the base of each of the driver transistors Q6, Q7 and Q8. The remaining end of bias resistors R45, R46 and R47, substantially identical to one another, is connected to source −V.

The input 2 to each of AND gates HD1, HD2, and HD3 is connected to the corresponding one of the anode ends of diodes CR40, CR41 and CR42, respectively.

Each trunk telephone line includes a corresponding T-lead, R-lead and H-lead. The respective T, R and H leads of trunk line "1", not illustrated, are connected electrically to terminals T1, R1 and H1; the respective T, R and H leads of trunk lines 2, not illustrated, are connected respectively to terminals T2, R2 and H2, and the T, R and H leads of trunk line 9 are connected to the respective terminals T9, R9 and H9. Likewise, similar terminals and connections for the T, R and H leads of trunk lines "3" through "8" are not illustrated but are represented in FIG. 2 by the dash lines in between trunk line 2 and trunk line 9 in the figure.

Each of the other trunk lines likewise has associated therewith a relay, not illustrated, as may be designated relays K2 through K9. An electromechanical type relay K1, shown on the right hand side of the FIG. 2b in circuit SC1, is associated with trunk line 1. Relay K1 includes three transfer contact sets K1-1, K1-2 and K1-3 associated with the corresponding leads for trunk line 1 on the left side of the figure. A similar three transfer contact sets K9-1, K9-2 and K9-3 are shown for a relay designated K9, not illustrated, and sets K2-1, K2-2 and K2-3 for a relay designated K2, not illustrated. Each of the other relays K3 through K9 unillustrated likewise contain three transfer contact sets.

Make contact of set K1-1 is connected to terminal T1; make contact of set K1-2 is connected to terminal R1; and make contact of set K1-3 is connected to terminal H1. These terminals are associated with circuitry for trunk line 1, not illustrated. In like manner, as illustrated, the make contacts of contact sets K2-1, K2-2 and K2-3 are connected to terminals T2, R2 and H2, respectively, associated with trunk line 2, and the make contact of sets K9-1, K9-2 and K9-3 are connected to the terminals T9, R9 and H9, respectively, associated with trunk line 9. Included, but not illustrated, the make contacts of each of the transfer contacts set associated with the described relays K3, K4, K5, K6, K7, K8, which are not illustrated, are connected to corresponding R, T and H terminals, not illustrated, associated with a corresponding one of the other trunk lines 3, 4, 5, 6, 7 and 8.

As illustrated, the break contact of the first set of relay K-1 is connected to the transfer contact of the corresponding contact set on the second relay, and so on up to the eighth relay which has its break contact of the first set connected to the transfer contact of the first contact set K9-1 of relay K9, not illustrated. As illustrated, a like electrical connection is made between the break contact of K1-2 through to the transfer contact of set K9-2, and from the break contact of K1-3 through to the transfer contact of K9-3. The set of relay contacts and trunk relays establishes a circuit for interconnecting the R ring and T tip leads, to which remote intercom substation 50 is connected, and a hold H lead to corresponding leads of one of the nine trunk lines, depending upon which one of line relays K1 through K9 of the select circuits SC1 through SC9 is energized in the manner subsequently described.

As is shown, normally a circuit exists between the tip or T lead, from telephone 50, 60 and 70, the transfer contact and break contact of transfer set K1-1 through similar transfer contacts and break contacts of each of the other relay contact transfer sets K2 through K8 and the transfer contact and break contact of contact set K9-1 through diode CR1 into the base of a transistor Q2. By a similar circuit, the ring or R lead from the remote intercom telephone stations normally is connected through the transfer contacts and break contacts K1-2 through K9-2 to circuit ground. A circuit for the hold driver is completed through the third transfer contact sets K1-3 and K2-3 through K9-3 to the emitter of transistor Q4.

Transistor Q2, suitably a PNP type, contains an emitter, base, and collector. The base of transistor Q2 is coupled in series with diode CR1 to the break contact of contacts K9-1. Diode CR1 is poled to allow current to pass in a direction from the relay break contact of K9-1 to the transistor base. A bias resistor R4 is connected between the base of Q2 and the source −V. A capacitor C2 is connected between the base and emitter of Q2 and output resistor R3 is connected between source −V and the Q2 collector. A diode CR3 has its cathode connected to the emitter of Q2 and its anode connected to ground. The circuit is the structure of a conventional pulse converter circuit which at its input receives voltage pulses of varying widths and shapes and provides a standard pulse as its output.

A diode CR7, poled as illustrated to conduct current, and a resistor R2 are connected in series between the collector of transistor Q2 and the base of another transistor Q1, suitably an NPN type transistor. A capacitor C1 is connected between the cathode of diode CR7 and source −V. A resistor R1 is connected between the base and the source −V and the emitter of transistor Q1 is similarly connected to source −V. A resistor 100K is connected between Q1, collector and ground. The circuit structure of Q1 is a conventional structure, sometimes referred to as a delay circuit, in which response to a pulse at its input switches into the On condition and remains in that condition for a predetermined period of time and thereupon restores to its Off condition if no subsequent pulses are received within that predetermined time period and switches into its current conducting condition until a predetermined period after the last pulse to its base input. This I designate as an "inter-digit storage circuit".

A resistor R8 is connected between the collector of transistor Q2 and the input of pulse shaper circuit PS, the latter of which is of conventional structure. The pulse shaper comprises a conventional semiconductor NAND gate connected as an inverter having three input terminals with one input for receiving the input signal and with the remaining two inputs connected to electrical ground potential. The output of pulse shaper PS is connected to one input of OR gate OR1 in FIG. 2b.

Element 101 represented in FIG. 2b is a semiconductor decimal counter of conventional structure, such as the type 4017A counter available from the Motorola or RCA Companies as type MC14017CP and CD4017CP, respectively. Briefly, such a counter, when in the reset condition, produces a high on the "0" position output and provides in sequence a "high" level output on the 1 to 9 outputs designated in the figure, for every "high" going pulse applied at its input T and, on receipt of the tenth pulse, again produces a high at the "0" output or reset condition. The counter includes a reset terminal designated R which is connected by a bias resistor 103 to source −B and to the break contact of relay transfer contact set T3-6 in FIG. 2a. Ground is connected to the transfer contact of T1-6 and the break contact thereof is connected to the transfer contact of T2-6. Similarly the break contact thereof is connected to the transfer contact of the contact set T3-6. The E terminal of counter 101 is connected to one input of gate HD-6 of the hold detector and the T input is connected to the output of OR gate OR1.

A certain portion of the apparatus and circuits are schematically illustrated within a rectangle formed by dash lines SC1 which I denote as a select circuit. Such apparatus and circuitry, as is illustrated within the dash lines SC1, is identical to such as is included, but not illustrated, within the rectangles formed by dash lines SC2, SC3, SC4, SC5, SC6, SC7, SC8 and SC9. Each of these circuits is associated with an individual one of the nine trunk lines designated TR1 through TR9 as shown, and extend through key service unit KSU by leads, not illustrated.

Select circuit SC1 includes a three-input NOR gate 121 of conventional structure as is illustrated by the NOR symbol. A NOR gate is a familiar logic circuit element which provides an output of a "low" if any of its inputs has a "high" applied to it. The first input thereof is connected in series with a diode CR101, poled as illustrated, to an input terminal SC1a, and is also connected in series with a bias resistor R101 to source −V. The second input is connected in series with a diode CR102 to a terminal SC1b and in series with a bias resistor R102 to source −V; and the third input is connected in series with a diode CR103 to an input terminal SC1c and is also connected in series with a bias resistor R103 to source −V.

By means of electrical leads, only partially illustrated, terminal SC1a is connected to the incoming call indication circuit of the first trunk line TR1; terminal SC1b is connected electrically to the answer circuit of the first trunk line TR1 and terminal SC1c is connected to the hold circuit of TR1, which circuits are found within the prior art key telephone system. As hereinafter explained in greater detail, in operation the NOR gate functions as a busy detector which provides an output if trunk line 1 is busy.

Transistor Q101 is suitably an NPN type transistor and functions as an electronic switch. The output of NOR gate 121 is connected to the base of transistor Q101 in series with a resistor R104. The emitter of Q101 is connected to the source of potential −V and the collector thereof is connected to the emitter of another transistor Q102 and is further connected in series with a resistor R106 to electrical ground potential and to an output reference point 135. A charging capacitor C101 is connected between the base of Q101 and the source −V.

An additional circuit extends from the input 133 in series with a diode CR104, poled as illustrated, and large resistance R105 to the base of transistor Q101.

Transistor Q102 is suitably an NPN type and functions as an electronic switch. This transistor is considered in conjunction with another switching transistor Q103, also an NPN type.

Transistor Q102 has a diode CR105 connected in series between the input at 134 and the base of Q102, with polarity as illustrated. A bias resistor R107 is connected between the base of Q102 and electrical ground potential. Transistor Q103 has its base connected in circuit with a circuit input 136, has its collector connected to electrical ground potential, and has its emitter connected to one end of the relay winding of relay K1. The other end of relay winding of K1 is connected to the transfer contact of the transfer contact set K1-4 of relay K1. The collector of aforementioned transistor Q102 is also connected to the transfer contact of relay contact set K1-4. This forms an electrical series circuit between the collector of Q102 and the emitter of Q103.

The make contact of contact set K1-4 is connected to the source −V to provide a hold circuit for the relay. Additionally, the winding of relay K1 is shunted by a diode CR106, poled as illustrated so as not to normally conduct current.

A like circuit with the same components for each of the remaining 8 trunk lines is included in this embodiment and this is represented by the figure simply by the dashed rectangles labeled SC2, SC3, SC4, SC5, SC6, SC7, SC8 and SC9, and the associated input and output terminals.

However for completeness of this description, major circuit elements which correspond in function and circuit to those in diagram SC1 are identified in the vertical columns as follows, which should assist in an understanding of the mode of operation hereafter considered:

| CIR-CUIT | NOR GATE | TRAN-SISTOR | COMPO-NENT | RE-LAY | CON-TACT | TRAN-SISTOR |
|---|---|---|---|---|---|---|
| SC1 | 121 | Q101 | Q102 | K1 | K1-4 | Q103 |
| SC2 | 221 | Q201 | Q202 | K2 | K2-4 | Q203 |
| SC3 | 321 | Q301 | Q302 | K3 | K3-4 | Q303 |
| SC4 | 421 | Q401 | Q402 | K4 | K4-4 | Q403 |
| SC5 | 521 | Q501 | Q502 | K5 | K5-4 | Q503 |
| SC6 | 621 | Q601 | Q602 | K6 | K6-4 | Q603 |
| SC7 | 721 | Q701 | Q702 | K7 | K7-4 | Q703 |
| SC8 | 821 | Q801 | Q802 | K8 | K8-4 | Q803 |
| SC9 | 921 | Q901 | Q902 | K9 | K9-4 | Q903 |

And the inputs and output of the other circuits and their correspondence to the inputs and outputs of the specifically illustrated circuit SC1 are set forth in the following columns:

| CIRCUIT | INPUT AND OUTPUTS | | | |
|---|---|---|---|---|
| SC1 | 133 | 134 | 135 | 136 |

-continued

| CIRCUIT | INPUT AND OUTPUTS | | | |
|---|---|---|---|---|
| SC2 | 233 | 234 | 235 | 236 |
| SC3 | 333 | 334 | 335 | 336 |
| SC4 | 433 | 434 | 435 | 436 |
| SC5 | 533 | 534 | 535 | 536 |
| SC6 | 633 | 634 | 635 | 636 |
| SC7 | 733 | 734 | 735 | 736 |
| SC8 | 833 | 834 | 835 | 836 |
| SC9 | 933 | 934 | N.A. | 936 |

The emitter of transistor Q5, previously described in connection with the busy defeat detector, has its emitter connected electrically in common with all of the inputs 133, 233, 333, 433, 533, 633, 733, 833 and 933 of the select circuits as illustrated.

The collector of transistor Q1, in addition to its connection to input 134, is connected in common to all of the other corresponding circuit inputs 234, 334, 434, 534, 634, 734, 834 and 934 of the select circuit.

A series of eight NAND gates of conventional structure N1, N2, N3, N4, N5, N6, N7 and N8, as designated and symbolically illustrated in FIG. 2b, are provided corresponding in number to one less than the number of select circuits SC1–SC9. Each of those NAND gates includes three inputs and a single output as is illustrated.

A first input of each of the NAND gates N1 through N8 is connected by lead 139 to the collector of transistor Q1.

The second input of gate N1 is connected to output terminal 135 of circuit SC1 and thereby is placed in circuit with the collector of transistor Q101. The second input of each of the remaining gates, N2 through N8, is connected to a corresponding terminal output, 235, 335, 435, 535, 735 and 835 in each of the select circuits SC1 through SC9, respectively.

The third input of gate N1 is connected to the input 136, placing it in circuit with the base of transistor Q103. A like connection is made from a corresponding location in the circuit of each of the remaining circuits, SC2 through SC8, namely inputs 236, 336, 436, 536, 636, 736 and 836 to the third input of NAND gates N2 through N8, respectively.

The 1, 2, 3, 4, 5, 6, 7, 8 and 9 outputs of electronic counter 101 are connected to corresponding ones of the inputs 136, 236, 336, 436, 536, 636, 736, 836 and 936, of select circuits SC1–SC9, respectively.

Two additional NAND gates N9 and N10, connected as an "OR" gate, and an OR gate OR2 are provided as represented by conventional graphical symbols. Gates N9 and N10 each have four inputs and one output and gate OR2 is a two-input single output device. As is illustrated, the outputs of gates N1 through N4 are connected in series with a corresponding one of resistors RN1, RN2, RN3 and RN4 to a corresponding one of the four inputs of NAND gate N9. Likewise, each of the outputs of NAND gates N5 through N8 are connected to an individual one of the four inputs of NAND gate N10 in series with a corresponding one of the four resistors RN5, RN6, RN7 and RN8. The output of AND gate N10 is connected in circuit with one input of OR gate OR2 and the output of NAND gate N9 is connected to the remaining input of that OR gate. In turn, the output of OR gate OR2 is connected to one of the two inputs of NOR gate OR1.

It is noted that the inherent input capacitance of the NAND gate together with the appropriate input resistor forms a time delay circuit having a slight time delay between the appearance of an output at a one of the gates N1 through N8 and the presentation of a sufficient voltage to an input of one of the NAND gates N9 and N10 and this time delay is essential in the operation of this circuit as becomes apparent from the description of operation of the invention explained hereinafter.

A dial and busy tone generator is included and symbolically illustrated as DBT. This is an integrated circuit chip, such as the Signetics Model 556 available from the Signetics Company, Sunnyvale, California. The circuit configuration and ancillary components and power supplies are not illustrated inasmuch as they do not form a part of the invention and are otherwise available in the literature of the Signetics Company. Briefly, the device generates a steady 400 hertz electrical signal, representative of a line seizure signal, unless a voltage is applied at its control input, in which case the 400 hertz signal is interrupted at a one-half hertz rate, representative of a busy signal. The output of the device is designated DBT-1 and a control input DBT-2 are illustrated. Input DBT-2 is connected to output "0" of electronic counter 101 and output DBT-1 is connected in series with a capacitor and resistor, not illustrated, to the break contact of relay contact set K9-1.

The power source is of any conventional type capable of supplying the desired DC voltages of $-V$ and $-V_2$. This is represented by the rectangle labeled PS in the lower left portion of FIG. 2a and by its outputs labeled $-V$ and $-V2$.

The operation of this embodiment is next described.

When the remote user at station 50 lifts his handset to place either an ordinary intercom call or to place an outside trunk call, ground potential, a voltage high, is applied from the closed hookswitch contact 56, terminal S(1), to the base of transistor Q10 and via diode CR12 to the base of transistor Q13. With ground so applied, transistor Q13 is biased to the Off condition so that its collector goes low. This low is coupled to the base of transistor Q12 via resistor R14 to, in turn, bias transistor Q12 to the Off or noncurrent-conducting condition. With transistor Q12 in the Off condition, current cannot flow through sounder 51 and the sounder cannot be operated. Additionally with a voltage low at the collector of Q13, acknowledgement over the BY lead in the key service unit is prevented since diode CR11 in that instance blocks a current path should relay contacts TE1-3 be closed for any reason.

With the telephone handset off-hook, a standard telephone intercom path is established through contacts T1-1 and T1-2 or contacts T1-3 and T1-4 to the corresponding T1 and R1 and T2 and R2 leads of the key service unit KSU to accomplish the normal functions of a remote intercom unit. If the remote user now wishes to place a call over the trunk lines, he operates push button 57. In so doing, ground potential is applied via hookswitch 56, push button contacts 57a, terminal CO(1) to the base of transistor Q11. That biases transistor Q11 to the On condition and provides a voltage high at both one end of diode CR40 and to one input of gates SD1 and SD2 of seize detector SD.

Transistor Q6, Q7 and Q8 are the relay drivers associated with the transfer relays T1, T2 and T3, respectively, which are in turn associated with corresponding ones of the three intercom stations 50, 60 and 70. Transistors Q6, Q7 and Q8 are normally electrically biased in the On condition by a voltage applied to the respective transistor bases in common from the output of the seize detector gate SD4 via resistor R40. This output voltage is normally a voltage low. The transistors cannot switch to "on" until a source of voltage is connected to the emitter. With transistor Q6 biased to the On condition and with a voltage high applied to its emitter, current flows through the transistor and the winding of relay T1. Relay T1 is energized and operates its contacts T1-1, T1-2, T1-3, T1-4, T1-5 and T1-6. This transfers the lines T1-1, R1-1, T2-1 and R2-1 from connection to the key service unit to connection with the tip and ring leads to the transfer contacts K1-1 and K1-2 of relay K1.

At this juncture in this description of the operation of the invention, the operation of the device I term the seize detector is considered. The seize detector prevents two stations from seizing the line-to-trunk access unit simultaneously since the unit can only service one such station at a time. As described previously, in switching "on", transistor Q11 of control circuit CC1 places a voltage high at one input of each of gates SD1 and SD2 via SD input A. If either of the remote stations 60 or 70 attempts to access the trunk to line unit concurrently with station 50, another voltage high appears at another input of one of the NAND gates SD1, SD2 or SD3. For example, if station 60 concurrently attempts to access the trunk unit, a voltage high is provided at input B of the associated control circuit which results in a high being placed at an input of gate SD3 and at the other input of gate SD1. In that event, both inputs to gate SD1 are at high and the output of that gate switches from high to low. With the gate output low applied to the input of gate SD4, gate SD4 then switches its output from low to high and thus removes the "low" bias from the base of each of the transistors Q6, Q7 and Q8. Those transistors then cannot be switched to the "on" condition. With transistors Q6, Q7 and Q8 being held in the Off condition, all of the corresponding transfer relays T1, T2 or T3 are prevented from operating and further operation is thus prevented until one of the remote station users releases his push button, such as 57 at station 50, and the output of the seize detectors again becomes a voltage high.

Assuming either the latter case or that the remote station 50 is the sole station seeking access, relay T1 operates, and a unique dial tone is returned to the station over the trunk to line access unit.

As was explained in connection with the description of the construction of the preferred embodiment, the telephone handset and related equipment are not illustrated in the FIGS. 2a and 2b since they are not necessary to an understanding of the invention. Likewise the switch which allows the local substation to switch between lines T1, R1, and lines T2, R2, is not disclosed. For convenience, we assume that the switch is connected to lines T1 and R1.

The dial and busy tone generator, DBT, properly connected to sources of power, not illustrated, generates and supplies at output DBT-1 a suitable continuous signal such as 400 hertz which is a unique tone associated with the line to trunk access unit. With relay T1 operated and line to trunk access unit free, the dial tone is supplied to the user at remote station 50 via the output $BDT_1$ via the lead to the break contact of contact set K9-1 and the transfer contact thereof and through the similar chain of contacts on relays K3 through K8, not illustrated, the transfer and break contacts K2-1 and the transfer and break contacts K1-1 to the tip line, and thus indicates to the user that the access unit is free for use. The transfer contact of relay contact T1-5 swings to its position with the make contact. The operation of hook-switch 56 to the closed position placed ground at the base of transistor Q10 and, accordingly, transistor Q10 is in the On condition so that its emitter is at a voltage high. This high is applied via the transfer and make contacts of contact set T1-5 to one side of the relay winding T1, thus current through transistor Q1, contacts T1-5, the relay winding of T1 to the source $-V$ maintains the relay T1 operated and the contacts T1-5 form a relay holding circuit. Thus even though the driver transistor Q6 is thereafter switched to its Off condition, the transfer relay T1 remains operated.

Relay contact T1-6, shown on the right hand side of FIG. 2a, swings from the position in contact with the break contact to the make contact to complete a circuit from voltage high, namely ground potential, through to the diode CR48, and there to the base of each of the transistors Q6, Q7 and Q8 to bias them into the Off condition. This voltage overrides any voltage applied from the seize detector, thereby preventing any other attempted seizure.

Additionally the ground is supplied to input 1 of gate BD1 in the busy defeat detector BDD and to input 1 of gate HD1 in the hold detector HD for purposes hereinafter discussed. Additionally the ground is removed from the circuit comprising the transfer and break contacts of each of the relays T1-6, T2-6 and T3-6 to input R of the electronic counter 101 in FIG. 2b. This enables the electronic counter.

Transistor Q2 functions as a pulse detector and is normally biased via resistor R4 in the On condition. Once the line to trunk access unit has been seized by station 50 ground, a voltage high, is applied to the base of Q2 via the following circuit: ground, the break and transfer contacts K9-2, through the contact chain and through the break and transfer contacts K1-2, through the R1 lead and transfer contact T1-2, through the closed circuit in the telephone instrument, not illustrated, including the dial pulsing contacts, out over line T1-1, transfer contact T1-1 and make contact, line T1, cver to the transfer contacts K1-1 and the break contact thereof, through the relay chain, including transfer and break contacts K9-1, through diode CR1 to the base of transistor Q2. Transistor Q2, accordingly, is placed in the Off condition and its collector is at a negative or voltage low. This negative voltage is applied via resistor R8 to one input of pulse shaper PS.

Transistor Q1 is normally in the On condition with a voltage high applied to its base, such as occurs in the case of transistor Q2 being in the current conducting condition. With transistor Q2 now in the Off condition, the voltage high is removed from the anode of diode CR7 and the negative bias from source $-V$ through resistor R1 provides the dominant bias at the base of transistor Q1 and, accordingly, transistor Q1 switches into its Off condition and its collector, accordingly, goes from a low to a voltage high condition. The output of the collector of transistor Q1 is applied to one of the inputs of each of the gates N1 through N8 in the scan detector, and is applied as well to each of the inputs 134, 234, 334, 434, 534, 634, 734, 834 and 934 in selector circuits SC1 through SC9 which are illustrated in FIG. 2b. Considering the select circuit SC1 as typical, the high at input 133 biases transistor Q102 to be in the On condition once other circuits are established as hereinafter becomes apparent.

The key service unit, KSU, circuits provide three inputs, SC1a, SC1b, SC1c, to the three inputs of NoR gate 121; thus if any of the ringing, answer or hold circuits in the key service unit associated with trunk line 1 are operating, a voltage high is applied to at least one of the respective inputs. With a high at any one of the three inputs, the output of busy detector 121 is low. However if the trunk line is free, all inputs to the NOR gate 121 are low causing the output of 121 to be high. This high is applied to the base of transistor Q101 via resistor R104.

Transistor Q101 is normally in the Off condition, however with a high applied to its base the transistor Q101 is placed in the On condition making its collector go to a voltage low. Inasmuch as the base of transistor Q102 is already at a voltage high, transistor Q102 is ready to conduct current if a load appears in the collector circuit. As is shown, the load in the collector circuit of Q102 is the winding of relay K1. Thus, if a proper voltage appears at input 136 of select circuit SC1, transistor Q103 operates to conduct current through relay K1 and through the collector to emitter circuit of Q102, causing transistor K1 to operate.

Assume now that the digit 1 is dialed. As soon as the dial breaks for the first pulse the ground is removed from the base of transistor Q2. With ground removed, transistor Q2 is biased to the On condition and conducts current causing its collector to go to a voltage high. Collector high forward biases the diode CR7, charges the capacitor C1, and biases transistor Q1 to its On condition. Transistor Q1 conducts current and causes its collector to go to a voltage low. This changes the bias on transistors Q102 and the equivalent transistors in each of the remaining select circuits SC2 through SC9, causing them to be biased into the Off condition.

The capacitor C1 is of such a value that it stays charged during the pulse period as occurs during dialing. For example, if the number 5 is dialed there will be five pulses separated by a between or interpulse period. In the case of the number 1 there is only one pulse, so the major time delay effect of capacitor C1 is not important. During the period in which capacitor C1 has not discharged sufficiently, transistor Q1 in each of the circuits remains "on" during dialing, and each of the transistors Q102 and the corresponding transistors in the remaining select circuits SC2 through SC9 remain in the Off condition. This prevents any of the relays K1, illustrated, and K2–K9, not illustrated, associated with SC1–SC9 from operating until dialing is completed. At the same time the collector of transistor Q2 being high causes the output of pulse shaper PS to go low and that, in turn, changes the state of the clock driver, gate OR1, and the output of that clock driver goes high. The high is applied to the trigger or T input of electronic counter 101 in FIG. 2b. Electronic counter 101 is a decimal counter of conventional structure which counts the high going dial pulses and gives a high output in sequence on its 1 to 9 and "0" outputs corresponding to the number of pulses received at its input. The unit is reset to zero when a high, such as ground, appears on the R input, and when reset to zero a high appears at its zero output. It is noted that the zero output is coupled to input BDT-2 of the dial and busy tone generator circuit for purposes hereinafter explained.

Pulse shaper PS, ideally a NAND inverter gate, is biased via resistor R8 to the voltage at the collector of transistor Q2 to normally have a voltage high on its output. This high is applied to one input of OR gate OR1, the clock drive unit, and causes the clock driver to normally have its output at a low. This low is applied to the trigger input T of the electronic counter.

As previously described, relay T1, contacts T1–6, removed ground from the R input of the counter. Accordingly, the electronic counter is ready to receive dialing pulses.

In a rotary dial system, dialing produces an interruption of the electrical circuit to the telephone for the duration of the pulse. As previously described, upon seizure of the line to trunk access unit a circuit was completed from ground through the telephone set to the base of transistor Q2. Accordingly, when the dial pulse contacts interrupt the circuit the transistor Q2 follows these interruptions and switches between its On and Off conditions. Thus, for example, for the number 5 the dial pulse contacts interrupt the high applied to the base of transistor Q2 five times in sequence. For the dialing of the number 1 this interruption occurs but once. Thus when the dial interrupts the line to generate the dial pulse, ground is removed from the base of transistor Q2 and causes transistor Q2 to turn on. Accordingly Q2 causes its collector to go to a voltage high. This high at the collector of Q2 biases the diode, charges capacitor C1 and turns on transistor Q1.

Transistor Q1 turns on and makes its collector go to the low condition, turning off transistors Q102 and the equivalent transistors in each of the circuits SC2 through SC9.

At the conclusion of the dial pulse a high appears on the 1 output of the electronic counter. As is shown the 1 output of the counter is coupled to input 135 of select circuit SC1, and from there to the base of relay driver transistor Q103. Additionally this high is applied to an input of gate N1 in the scan detector for reasons which later become apparent. With a high at the base of Q103 the transistor is switched into its On or current conducting condition.

Returning now to the consideraton of the transistor Q1, after a sufficient period of discharge of capacitor C1 governed by the values of the resistances R2 and R1 and the absence of additional dial pulses, transistor Q1 switches back into its Off condition, placing a voltage high at input 133. And accordingly, transistor Q102 is again biased to the On condition. With both transistor Q102 and Q103 biased to the On condition, a current path is completed through ground resistor R106, the emitter and collector of Q102, the winding of relay K1, the emitter and collector of Q103, and energizes relay K1. Relay K1 operates and closes its contacts K1–4 which places one end of the relay winding K1 at the potential of source −V to complete a holding circuit for the relay. Thus relay K1 remains operated as long as transistor K103 is biased in the On condition.

As previously explained, each of the relays corresponding to K1 are associated with a corresponding one of the trunk lines. Accordingly, when relay K1 operates, it operates its contacts K1–1, K1–2 and K1–3 seen in FIG. 2a. This completes a circuit between the leads of station 50 and the T1, R1 and H1 leads associated with the first trunk line in the line card of the conventional key service unit. At that time the party at station 50 can further dial over the trunk line to complete an outside call.

Although the foregoing example was given in connection with the dialing of the number 1, it is seen that the same result occurs were the station user to dial the number 5. However, in that instance, transistor Q2 would have switched on and off five times in sequence. The output of pulse shaper PS would have similarly switched on and off five separate times, and the output of clock driver OR1 would have provided five distinct pulses to the input of counter 101, and a high would have appeared at the 5 output of the counter.

During the period of occurrence of this series of pulses, transistor Q1 would have switched off upon the first dial interruption and would have remained off during the period between the dial pulses, thus preventing any of the relays in the select circuits SC1–SC9 from inadvertently operating.

In the next example of the operation of the invention, one considers the circuit operation which occurs in the event that the selected trunk line is busy. As becomes apparent, the output of OR gate OR2 supplies automatically an additional pulse to OR gate OR1 and that gate in turn supplies a pulse to the counter 101 to advance the counter to the next position.

Thus if trunk line 1 is busy there will be at least one high at one of the inputs of busy detector 121. Accordingly, the output of gate 121 is low. This "low" in turn biases busy driver transistor Q101 to the Off condition. With transistor Q101 off, the collector is at a voltage high, as appears through resistor 106 to ground. And the output 135, which is connected to an input of gate N1, is at a voltage high. Thus with trunk line 1 busy at the conclusion of the dialed digit "1", the output of transistor Q1 goes "high" when transistor Q1 switches off, and via lead 139 applies a high to the first input of gate N1. The output of SC1 at terminal 135 is also at a voltage high in accordance with the previous assumptions, which is applied to the second input of gate N1. And with the electronic counter 101 stepped to the first position the 1 output is at a voltage high and this is applied to the third input of N1. Accordingly, all three inputs to gate N1 are at a voltage high causing the output thereof to go low. With a low at its input NAND gate N9 output switches from a low to a high and this is supplied to the input of OR gate OR2. In turn, OR gate OR2 switches its output condition from a high to a low and applies that low to the 1 input of OR gate OR1, and the OR gate, in turn, applies an additional high pulse to the trigger input T of the electronic counter. It is noted that the resistor RN1 operates in conjunction with the input capacitance of the NAND gate to provide a slight time delay to ensure that any additional pulse arrives at the trigger input of counter 101 subsequent to the time when any earlier input is terminated. The same useful delay effect occurs with each of the other RN resistors and the associated NAND gates so that any pulses that are generated in this way are separated or spaced in time and do not overlap, in which latter case the counter would not be stepped. Accordingly, the output of the counter advances and supplies a high at output 2. Assuming now that the second select circuit SC2 is similarly busy, the output at 235 will be high, which again, as in the preceding case, makes all three inputs to the gate N2 at a high, and accordingly another pulse is generated through the action of gates N2, N9, the OR gate OR2, gate OR1, trigger input of the counter, and the counter advances to the next position resulting in a high at the 3 output. Assuming the trunk line associated with SC3 is not busy, then the output at 334 of SC3 is low and the gate N3 will not switch its state. Subsequently, the corresponding relay in circuit SC3, corresponding to relay K1 in SC1, and its associated driver relay will operate to close a line relay K3, not illustrated, associated therewith and connect the appropriate lines from station 50 to the trunk line via the relay contacts K3-1, K3-2 and K3-3 in the relay chain in FIG. 2a corresponding to the illustrated relay contacts K1-1, K1-2 and K1-3 in FIG. 2a.

All Trunks Busy

In the event that all of the nine trunk lines associated with the circuit are busy, counter 101 steps its output in the aforedescribed manner to the ninth position and stops. The low at the "0" position in turn is applied to input DBT-2 of the dial and busy tone generator. The DBT circuit detects the low and internally causes the 400 hertz signal to be interrupted at the rate of one-half hertz so as to generate a distinctive busy tone signal. This signal is applied over the same output DBT-2 and over the lines including the K9-1 through K1-1 contacts, snce none of these relays operated, to the user's telephone at substation 50 in the same transmission path that was used for the passing of the original access tone.

Receiving an Incoming Call

Since the line to trunk access unit detects any trunk that is answered or on hold as busy, the selector circuit will by-pass that trunk if it is dialed by the user in the manner previously described, unless further action is taken. In this regard, a busy detector defeat circuit is provided. When an incoming trunk call appears at the key service unit, the operator at the key service unit may access the party at the remote intercom station, such as station 50, by dialing the number associated with that remote station, and through conventional circuitry in the key service unit this applies an operating current through relay TE1 and diode CR14 connected between terminals UN1 and TN1 to operate this relay. Relay TE1 closes its contacts TE1, TE2 and TE3. Contact TE1-2 places a voltage low at the base of transistor Q13 if remote 50 is not "off-hook". Q13 switches on, causing its collector to go high, which in turn biases transistors Q12 to the On condition. Transistor Q12 completes a circuit from ground through the sounder 51 and the collector to emitter circuit thereof to pass current through the sounder 51 so as to alert the party at station 50. Additionally the high at the collector of Q13 is applied to the gate electrode of silicon controlled rectifier MCR120 to prepare MCR120 to conduct current.

It is noted that if station 50 is off-hook, the voltage high (ground) applied via diode CR12 to the base of transistor Q13 overrides the voltage low applied via resistor R17 to maintain transistor Q17 in the "off" condition and thereby prevent sounder 51 from being energized at this time.

When the party at the remote station removes the handset to answer the call, the hookswitch 56 closes completing a ground to the base of transistor Q10, and Q10 is biased thereby to its On condition, placing a high at its emitter. This high is applied to the anode of MCR120. Thus with the anode of MCR120 at a high, the cathode connected via resistor R18 to a low and the gate at a high, the SCR switches "on". This switches the input at 2 of gate BD1 in the busy defeat detector BDD to become high.

After the operator at the key service unit relates the information to the user at station 50 and the user desires to access the trunk line on which the incoming call awaits, the user must then obtain the access unit by depressing push button 57. Those closes circuit ground a high to the base of transistor Q11 as in the previous case, causing transistor Q11 to turn on. This seizes and holds the transfer relay associated with station 50, T1, in the same manner as described in the previous description of operaion. However relay contacts T1-6 transfers ground, a voltage high, to the make contact in the set and this is coupled over the illustrated leads to the first input of gate BD1 in the busy defeat detector. Accordingly, a high is presented at both inputs of AND gate BD1 and the output of AND gate BD1 goes "low". This low is applied to the one input of the busy defeat detector AND gate BD4. Normally busy defeat detector gate BD4 had a high at each of its three inputs and, accordingly, its output was low. Accordingly, with one input at a low the output of the gate BD4 goes high to bias the base of busy defeat driver transistor Q5.

With a high at its base, transistor Q5 is biased into the On condition. This completes a circuit through the transistor to ground through each of the inputs 131 through 931 in the select circuits. Taking the circuit SC1 as typical, with input 131 at a voltage high the base of busy driver transistor Q101 is biased to the On condition regardless of the condition of any of the associated busy detectors, such as busy detector 121 in circuit SC1, and a "low" is provided to output 135 of SC1. Accordingly the user may then dial the appropriate trunk line. Giving trunk line 5 as an example, the user dials 5 and five pulses, as occurs in the preceding description, steps the electronic counter 101 to its fifth position resulting in a high at output 5. Inasmuch as the outputs of each of the select circuits SC1 through 9, namely 535, is at a voltage low, the scan detector, gates N1 . . . N8, does not operate to perform the automatic trunk hunting feature. As in the preceding description, the line relay associated with the line coresonding to relay K5, not illustrated, in SC5 operates and holds. In so doing, the appropriate set of relay contacts in the chain illustrated in FIG. 2a operates to connect the user at station 50 to the appropriate trunk line.

Hold (Litkey-Tie)

Once the user is connected to the appropriate trunk line, a circuit "ground" necessary to place the line on hold is furnished by transistor Q4, the hold driver, which is normally on.

Normally, gate HD-1, HD-2 and HD-3 of the hold detector HD have a low on their input and, in turn, the output of each is at a high. These highs are connected to gate HD-4 input normally making the output of HD-4 a voltage low. The low output of HD-4 is connected on one input of gate HD-6.

The output of gate HD-5 is low until a trunk line is seized. With lows on the two inputs of gate HD-6, its output is at a high and this high is applied to the base of transistor Q4, biasing Q4 in the "on" condition.

When a trunk line is seized, the high applied to the input of HD-5 via the K1-3 . . . to K9-3 contacts is interrupted and the input goes low. Hence the output of HD-5 goes high, which high, in turn, is coupled to one input of HD-6. However, HD-6 does not provide a low at its output until a high is present on each of its inputs.

When station 50 seizes the line to trunk access unit relay, contact T1-6 places a high on one input of HD-1. If the user wishes to place the call on hold, he depresses push button 57. This action turns on transistor Q11 and places a high on the remaining input of gate HD-1. The output thereof goes low and causes the output of gate HD-4 to go high. There are now two highs on the inputs of HD-6, and the output of gate HD-6 goes low, biasing off transistor Q4. With Q4 off, resistor R43 now furnishes the ground to the H-lead of the trunk line.

While maintaining the push button 57 depressed, the user replaces his handset on its cradle and the station thereby goes "on-hook", removing ground potential from the H-lead. This sequence is recognized by equipment in the key service unit KSU, which places the trunk line in the "hold" condition.

The foregoing description of the preferred embodiment of my combination and subcombination inventions is sufficient in detail to enable one skilled in the art to practice and use the invention. However it is expressly understood that my invention is not to be limited to those details presented for that purpose inasmuch as many modifications and substitutions of equivalent elements, all of which are within the spirit of my invention, become apparent to those skilled in the art upon reading this specification. Accordingly it is respectfully requested that my invention be broadly construed within the full spirit and scope of the appended claims.

What I claim is:

1. A selection device for connecting one of a plurality of electrical input circuits to a single electrical output circuit comprising:

a plurality of switch means, one associated with each of said input circuits for initiating a circuit selection;

a corresponding plurality of electromagnetic relay means, each having a winding;

a corresponding plurality of transistor means, each of said transistor means having a base, emitter and collector;

means connecting the associated ones of said switch means, said emitter, said collector and the relay winding in an electrical series circuit across a source of voltage;

gate means normally providing an output to the base of all said transistor means for biasing same to a current conducting condition and responsive to operation of more than one of said switch means concurrently for providing an output to the base of each of said plurality of transistor means to bias all said transistor means in the noncurrent conducting condition during simultaneous operation of more than one switch means;

whereby operation of a single one of said switch means completes a current conducting path through the emitter of the associated transistor means and through the associated relay winding in series to energize said relay means;

a plurality of holding circuit means responsive to operation of an associated one of said relay means for completing an electrical holding circuit to the associated winding thereof to maintain said relay means operated irrespective of the current conducting condition thereafter of the associated transistor means; and inhibit means responsive to any one of said relay means being in the operated condition for providing an output to the base of all said transistor means to bias said transistor means into the concurrent conducting condition;

a plurality of relay contact means, one contact means associated with each relay means and with one of said circut inputs and said single electrical output, for completing an electrical circuit between a respective input and the output.

2. The invention as defined in claim 1 wherein said inhibit means comprises a plurality of contact means, one associated with each of said relay means, for applying a bias voltage from a source to said base of each transistor means responsive to energization of the associated relay means.

3. In a telephone system containing a plurality of telephone subsets, an electrical output circuit and an electrical input associated with each of said telephone subsets, each of said telephone subsets contains hookswitch means operable between an on-hook and off-hook condition, and a selection means for selectively connecting any one of said electrical input circuits to said electrical output circuit, the improvement therein comprising:
 a plurality of switch means, one associated with each of said input circuits for initiating a circuit selection;
 a corresponding plurality of electromagnetic relay means, each having a winding;
 a corresponding plurality of transistor means, each of said transistor means having a base, emitter and collector;
 means connecting the associated ones of said switch means, said emitter, said collector and the relay winding in an electrical series circuit across a source of voltage;
 gate means normally providing an output to the base of all said transistor means for biasing same to a current conducting condition and responsive to operation of more than one of said switch means concurrently for providing an output to the base of each of said plurality of transistor means to bias all said transistor means in the noncurrent conducting condition during simultaneous operation of more than one switch means;
 whereby operation of a single one of said switch means completes a current conducting path through the emitter of the associated transistor means and through the associated relay winding in series to energize said relay means;
 a plurality of holding circuit means, one associated with each subset, responsive to operation of an associated one of said relay means for completing an electrical holding circuit to the associated winding thereof to maintain said relay means operated during said hookswitch means of the associated subset being in the off-hook condition irrespective of the current conducting condition thereafter of the associated transistor means; and
 inhibit means responsive to any one of said relay means being in the operated condition for providing an output to the base of all said transistor means to bias said transistor means into the noncurrent conducting condition;
 a plurality of relay contact means, one contact means associated with each relay means and with an associated one of said circuit inputs of an associated subset and said single electrical output, for completing an electrical circuit between a respective input and the output.

4. The invention as defined in claim 3 wherein each of said switch means completes the said series circuit through an associated hookswitch means, said hookswitch means being in the off-hook condition.

* * * * *